(12) United States Patent
Belz

(10) Patent No.: US 8,421,276 B2
(45) Date of Patent: Apr. 16, 2013

(54) BATTERY BACKUP PROTECTION CIRCUIT

(75) Inventor: Jeff Belz, Eastpointe, MI (US)

(73) Assignee: Masco Canada Limited, London, Ontario (CA)

( * ) Notice: Subject to any disclaimer, the term of this patent is extended or adjusted under 35 U.S.C. 154(b) by 410 days.

(21) Appl. No.: 12/712,498

(22) Filed: Feb. 25, 2010

(65) Prior Publication Data

US 2011/0204728 A1  Aug. 25, 2011

(51) Int. Cl.
*H02B 1/24* (2006.01)

(52) U.S. Cl.
USPC .......................................................... 307/127

(58) Field of Classification Search ................... 307/127
See application file for complete search history.

(56) References Cited

U.S. PATENT DOCUMENTS

| | | |
|---|---|---|
| 3,223,892 A | 12/1965 | Dortort |
| 3,659,183 A | 4/1972 | Carlson |
| 4,654,575 A * | 3/1987 | Castleman ............... 340/636.13 |
| 4,788,450 A | 11/1988 | Wagner |
| 4,857,985 A | 8/1989 | Miller |
| 5,410,441 A | 4/1995 | Allman |
| 5,517,379 A | 5/1996 | Williams et al. |
| 5,539,610 A | 7/1996 | Williams et al. |
| 5,541,800 A | 7/1996 | Misencik |
| 5,757,600 A | 5/1998 | Kiraly |
| 5,764,465 A | 6/1998 | Mattes et al. |
| 5,831,416 A | 11/1998 | Fisher |
| 6,075,345 A | 6/2000 | Lee |
| 6,104,302 A | 8/2000 | Vuong |
| 6,825,577 B2 | 11/2004 | Soto et al. |
| 7,126,801 B2 | 10/2006 | Jokinen |
| 7,362,157 B2 * | 4/2008 | Logiudice ..................... 327/318 |
| 2008/0283786 A1 | 11/2008 | Snodgrass |

* cited by examiner

*Primary Examiner* — Rexford Barnie
*Assistant Examiner* — Dru Parries
(74) *Attorney, Agent, or Firm* — Carlson, Gaskey & Olds

(57) ABSTRACT

An exemplary control system has an input connector operable to connect to a power source and at least one output connector operable to connect to either a load or a power source. A first solid state switch is also provided, operable to control a flow of current between the input connector and the output connector. A second solid state switch communicates with the first solid state switch and is operable to command the first solid state switch to prevent the flow of current between the output connector and input connector in response to the power source being connected to the output connector.

23 Claims, 3 Drawing Sheets

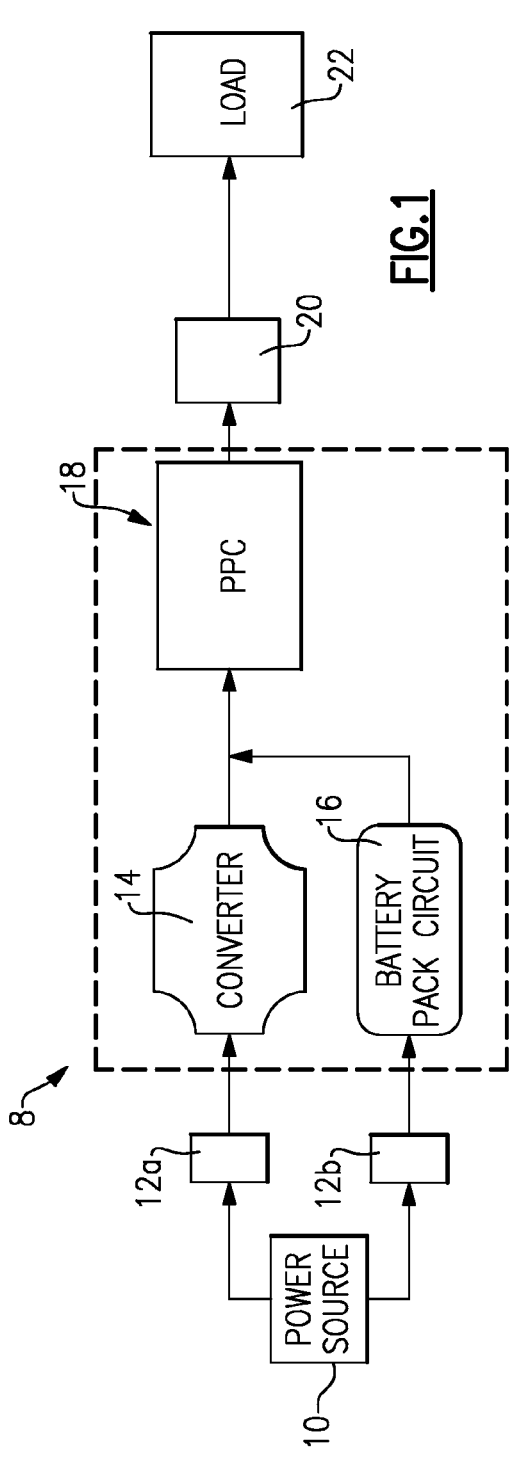
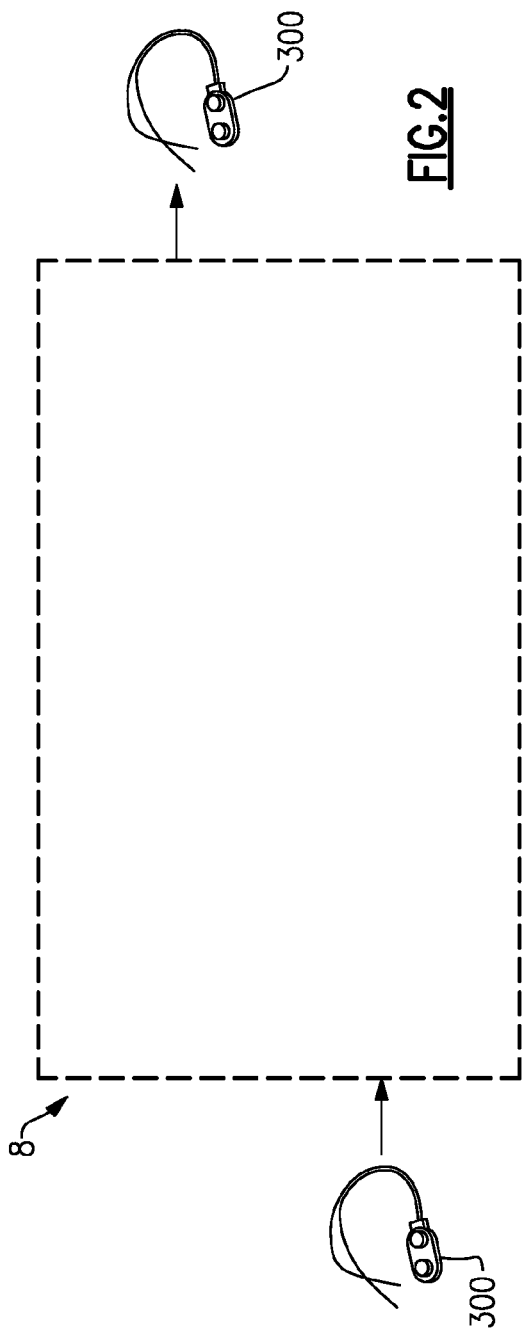

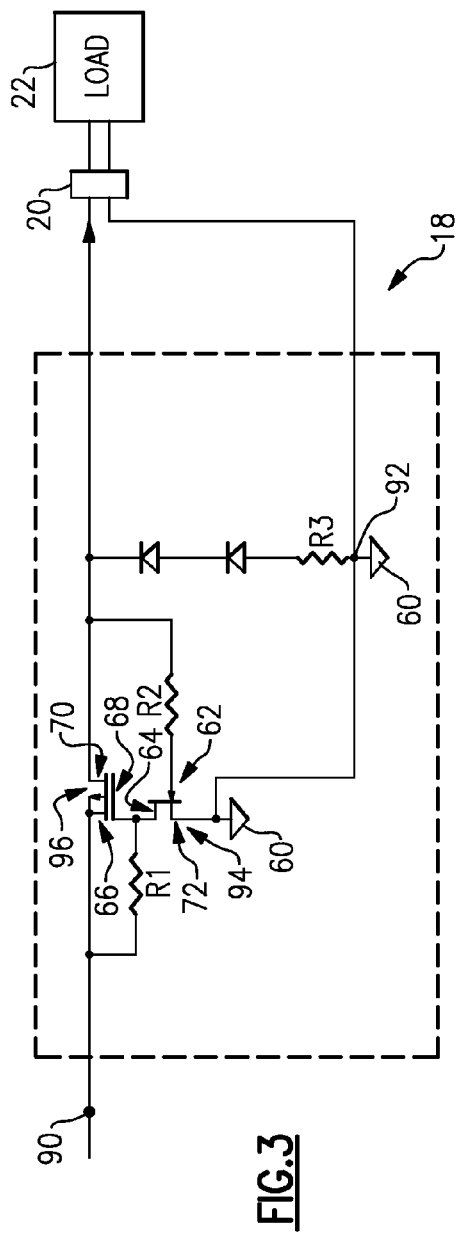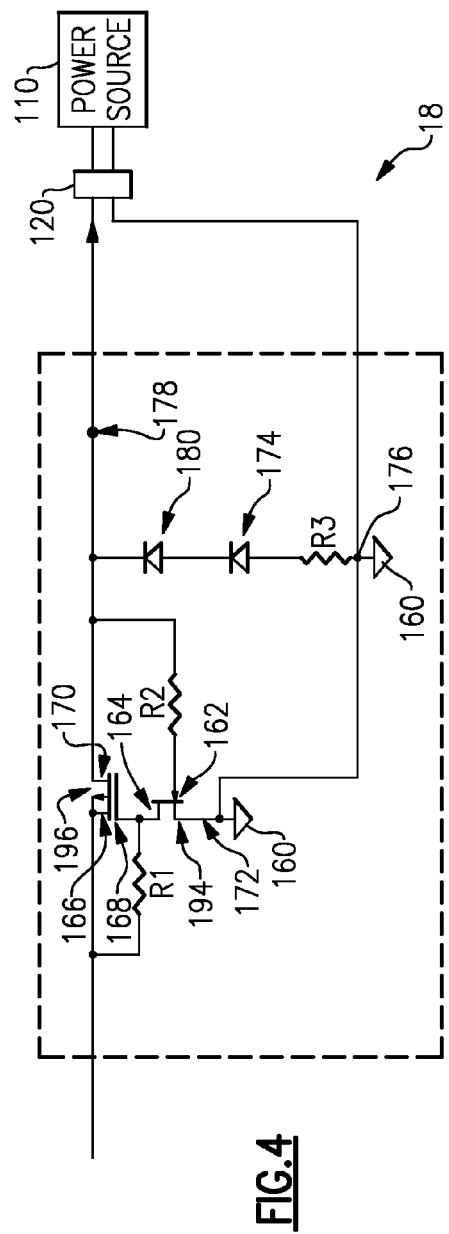

US 8,421,276 B2

BATTERY BACKUP PROTECTION CIRCUIT

BACKGROUND OF THE INVENTION

Control systems relate generally to providing power needed by a receiving device, known as the load, from a given power source. Within a control system, there may be many electrical components. For example, an AC to DC conversion circuit, integrated circuit devices, or other semi-conductor devices may be present within the control system to enable proper operation.

A control system may include separate output and input connectors to receive a variety of inputs and outputs. Many of the electronic devices that are used with control systems have similar means of connecting to the control system as the power sources providing power to the control system. If an input device such as a power source is improperly received into an output connector, components of the control system may become damaged.

SUMMARY

An exemplary control system has an input connector operable to connect to a power source and at least one output connector operable to connect to either a load or a power source. A first solid state switch is also provided, operable to control a flow of current between the input connector and the output connector. A second solid state switch communicates with the first solid state switch and is operable to command the first solid state switch to prevent the flow of current between the output connector and input connector in response to the power source being connected to the output connector.

An exemplary battery backup protection circuit has a first solid state switch operable to control a flow current between an input connector and an output connector and a second solid state switch in communication with a gate of the first solid state switch. The first solid state switch and the second solid state switch both prevent communication of current to one of at least one electrical component or the input in response to a current from an output connector. An indicator is also provided operable to alert in response to receiving a current from an output connector.

An exemplary method of controlling a flow of current includes first providing an output connector operable to provide negative voltage to a first solid state switch. The first solid state switch is then turned off in response to the negative voltage. A second solid state switch in communication with the first solid state switch is then turned off in response to the first solid state switch. A notification in response to the power source being connected to the output is then provided.

These and other features of the present invention can be best understood from the following specification and drawings, the following of which is a brief description.

BRIEF DESCRIPTION OF THE DRAWINGS

FIG. 1 schematically illustrates a control system.
FIG. 2 schematically illustrates example connectors for the control system of FIG. 1.
FIG. 3 schematically illustrates a battery backup protection circuit having a properly connected power source.
FIG. 4 schematically illustrates the battery backup protection circuit of FIG. 3 having a power source improperly connected to its output.

DETAILED DESCRIPTION OF THE PREFERRED EMBODIMENT

Figure 5:
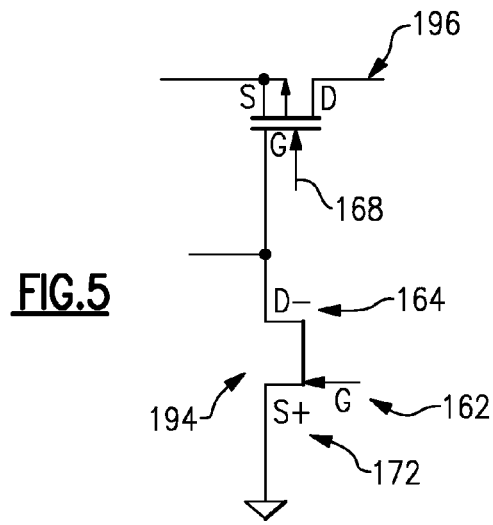
FIG. 5 schematically illustrates the solid state switches of the battery backup protection circuit of FIG. 3.

Referring to FIG. 1, a control system 8 is provided including a power source 10, input connectors 12a-b, electrical components 14,16, an output connector 20 and a load 22. The control system 8 also includes a protection circuit 18 that may offer a protective shut off feature if the power source 10 is improperly connected to the output connector 20.

The power source 10 may include a battery pack, such as a 6 volt DC battery packs, or an AC transformer depending on system needs. Of course, these are only examples and it is understood that other power sources could be used. The power source 10 provides current via input connectors 12 through the various components 14, 16, 18 of the control system 8, to an output connector 20. In one non-limiting example, the power source may include both an AC transformer and a battery pack.

Multiple input connectors 12a-b can be used to allow more than one power source 10 to provide current. In one non-limiting example, one of the input connectors 12a-b is connected to an AC transformer and another of the input connectors 12a-b is connected to a battery. In this example, if the AC transformer is unable to provide current, the battery pack connected to the system 8 may be configured to provide backup power.

Current flows through the control system 8 to the load 22. The load 22 may include electronic products such as, but not limited to, electronic flush valves, electronic faucets, and electronic soap dispensers.

The input connector 12 facilitates a flow of current from the power source 10 to various portions of the control system 8, such as a conversion circuit 14 or a battery pack circuit 16. In one example the conversion circuit 14 is an AC to DC conversion circuit. Other electrical components within the control system 8 (not shown) may include integrated circuit devices, other semi-conductor devices, or other similar components. The components may depend on the type of power source. In one non-limiting example, the system 8 including the protection circuit 18 is a power control system or an electronic switching system.

Referring to FIG. 2, with continued reference to FIG. 1, both the input connectors 12a-b and output connector 20 may be 9 volt battery connectors 300. Of course, this is only one example connector, and it is understood that other connectors could be used.

Referring to FIG. 3, with continued reference to FIG. 1, the battery backup protection circuit 18 is shown. The protection circuit 18 includes a first solid state switch 96 and a second solid state switch 94. The first solid state switch 96 controls a flow of current between the input connectors 12a-b and the output connector 20. As will be described below, if the power source 10 is connected to the output connector 20 instead of to one of the input connectors 12a-b, the second solid state switch 94 turns OFF the first solid state switch 96 to prevent the flow of current between the connectors 12a-b, 20. The first solid state switch 96 includes a source 66, a gate 68 and a drain 70, while the second solid state switch 96 includes a source 72, a gate 62 and a drain 64. If the power source 10 is connected to the input connector 12, there is a positive first node 90 and a negative second node 92 created from providing current, allowing current flow from the positive first node 90 to the negative second node 92 within the protection circuit 18. The positive current flows into the protection circuit 18 at the positive first node 90, passing through resistor R1 to reach the gate 68 of the first solid state switch 96 to turn the switch 96 ON. The positive voltage from the current on the gate 68 of the first solid state switch 96 allows continuous current to flow from the input connector 12 through the first solid state switch 96 continuing through the rest of the circuit 18 to the output connector 20.

The second solid state switch 94 has a default ON state, and only turns OFF if a negative voltage is connected to its gate 62. The second solid state switch 94 will receive a positive voltage if current is communicated through resistor R2 to the gate 62 of the second solid state switch 94 as a result of proper connection. In one example the first solid state switch 96 may be a MOSFET, or functional equivalent, and the second solid state switch 94 may be a JFET, or functional equivalent. In one non-limiting example, the second solid state switch 94 is a n-channel JFET, as shown in FIG. 3. Of course, these are only examples and other solid state switches could be used. The second solid state switch 94 is connected to ground 60. The current will flow through the input connector 12 to the load 22 which then returns current to the negative second node 92, which is also connected to the ground 60. If there is a positive first node 90, as shown in FIG. 3, the power source 10 has been properly connected to the input connector 12 and the system functions properly to provide power to the load 22. Therefore, the first solid state switch 96 is able to communicate current from an input connector 12 to an output connector 20 allowing the power source 10 to provide power to the load 22.

Referring to FIG. 4, with continued reference to FIG. 1, if a power source 110 is connected to the output connector 120, a DC voltage is provided to the protection circuit 18 via the power source 110. The protection circuit 18 includes a positive first node 176 and a negative second node 178. Positive voltage is present at the positive node 176 via the power source 110, through resistor R3 to an indicator 174, activating the indictor 174. The indicator 174 may be a light emitting diode, which will light up to indicate an improper connection. The current then flows through diode 180 to the negative node 178 and back to the output connector 120 completing the circuit. However, as the first node 176 is grounded to the same ground 160 as the second solid state switch 194, a negative voltage is provided by current within the circuit 18 to the second solid state switch 194.

Referring to FIG. 5, with continued reference to FIGS. 1 and 3, the positive voltage of the power source 10 is applied at the source 172 of the second solid state switch 194. The gate 162 of the second solid state switch 194, which is always set to a default ON position, will then open the connection between the source 172 and the drain 164 of the second solid state switch 194 to prevent flow of current through the second solid state switch 194, effectively turning the second solid state switch 194 OFF. If the solid state switch 194 is turned OFF, the gate 168 of the first solid state switch 196 will no longer receive current or a negative charge. Once the gate fails to receive the negative voltage, the first solid state switch 196 will turn to an OFF position, preventing flow of current through the first solid state switch 196. If both the first solid state switch 196 and second solid state switch 194 are in the OFF position, currents provided to the system 8 by the power source 110 improperly connected to the output connector 120 are prevented from traveling past the protection circuit 18 within the system 8. Thus, other components 14, 16 of the control system 8 will not receive current or negative voltage from the improper connection of the power source 110, and will similarly not be damaged by said current or negative voltage.

Figure 6:
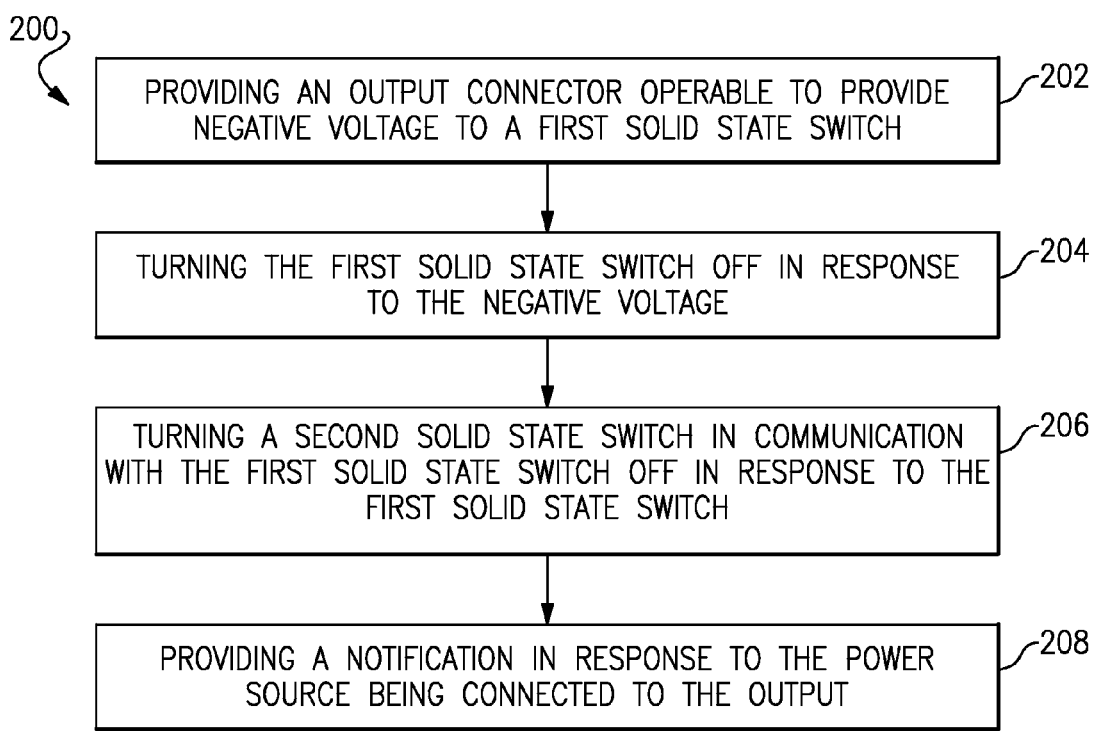
FIG. 6 is a flow chart of an exemplary method for controlling a flow of current.

Referring to FIG. 6, with continued reference to FIG. 1, a method 200 for controlling a flow of current, such as the flow of current within a control system 8, is shown. The output connector is provided with a current from the improper connection of a power source to the output connector, with the output connector operable to provide negative voltage to a first solid state switch 202. The first solid state switch will turn to an OFF position in response to receiving the negative voltage 204. Step 204 is accomplished by applying a negative voltage to the gate 162 of the second solid state switch 194. If the first solid state switch is turned to an OFF position, a second solid state switch which is in communication with the first solid state switch will also turn OFF in response to the first solid state switch 206. The current from the improper connection of the power source to the output connector also provides current to an indicator, which provides a notification in response to the power source being improperly connected to the output 208. This allows indication of the improper connection, such that it may be remedied.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A control system comprising:
    an input connector operable to connect to a power source;
    at least one output connector operable to connect to one of a load or the power source;
    a first solid state switch operable to control a flow of current between the input connector and the output connector; and
    a second solid state switch in communication with the first solid state switch, the second solid state switch operable to command the first solid state switch to prevent the flow of current between the output connector and the input connector in response to the power source being connected to the output connector, wherein if the power source is connected to the output connector a negative voltage from the power source is applied to the gate of the second solid state switch to turn the second solid state switch and the first solid state switch OFF.

2. The control system of claim 1, wherein the second solid state switch is connected to a control of the first solid state switch.

3. The control system of claim 1, including a notification device operable to provide a notification in response to the power source being connected to the output connector.

4. The control system of claim 3, wherein the notification device includes a light-emitting diode.

5. The control system of claim 1, wherein the input and output connectors are 9 volt battery connectors.

6. The control system of claim 1, wherein the first solid state switch is a MOSFET and the second solid state switch is a JFET.

7. The control system of claim 6, wherein the JFET is an N-channel JFET.

8. The control system of claim 1, wherein the power source is DC voltage.

9. The control system of claim 1, wherein the control system is one of a power control system or an electronic switching system.

10. The control system of claim 1, wherein the load is an electronic faucet.

11. A control system comprising:
    an input connector operable to connect to a power source;

at least one output connector operable to connect to one of a load or the power source;

a first solid state switch operable to control a flow of current between the input connector and the output connector; and a second solid state switch in communication with the first solid state switch, the second solid state switch operable to command the first solid state switch to prevent the flow of current between the output connector and the input connector in response to the power source being connected to the output connector, wherein the load includes at least one of an electronic soap dispenser and an electronic flush valve.

12. A battery backup protection circuit comprising:

a first solid state switch operable to control a flow of current between the input connector and the output connector;

a second solid state switch in communication with a control of the first solid state switch, the first solid state switch and second solid state switch being operable to prevent communication of current to one of at least one electrical component of the input in response to a current from an output connector, wherein the second solid state switch turns to an OFF position only when a negative voltage is connected to a gate of the second solid state switch; and an indicator operable to alert in response to receiving a current from the output connector.

13. The circuit of claim 12, wherein the first solid state switch is a MOSFET and the second solid state switch is a JFET.

14. The circuit of claim 12, wherein the indicator is an light emitting diode and is operable to indicate if the circuit receives current from the output connector.

15. The circuit of claim 12, wherein the indicator is an LED and is not operable to illuminate if receives current from an input connector operable to connect to a power source.

16. The battery backup protection circuit of claim 12, wherein the output connector is operable to connect to one of a load or the power source, wherein the load includes at least one of an electronic soap dispenser, an electronic flush valve, and an electronic faucet.

17. A method of controlling a flow of current comprising:
a) providing an output connector operable to provide negative voltage to a first solid state switch;
b) turning the first solid state switch OFF in response to the negative voltage;
c) turning a second solid state switch in communication with the first solid state switch OFF in response to the first solid state switch turning OFF; and
d) providing a notification in response to the power source being connected to the output.

18. The method of claim 17, wherein said step (B) includes:
applying a negative voltage from the power source to a second solid state switch to turn OFF the second solid state switch, the second solid state switch being connected to a gate of the first solid state switch.

19. The method of claim 18, wherein said step (D) includes turning ON a light-emitting diode.

20. The method of claim 18 wherein the second solid state switch has a default state of being turned ON to permit the electric current to pass through the first solid state switch between the input and the output.

21. The method of claim 17 further comprising the step of receiving a current from an input connector operable to connect to a power source.

22. The method of claim 21 further comprising the step of turning the first solid state switch to an ON position in response to the second solid state switch.

23. The method of claim 17, wherein step a) includes providing an output connector operable to provide negative voltage to a gate of the first solid state switch.

* * * * *